Aug. 22, 1933.  E. W. ERICSON  1,923,665
MOUNTING FOR SLIDING VEHICLE WINDOWS
Filed Oct. 30, 1929
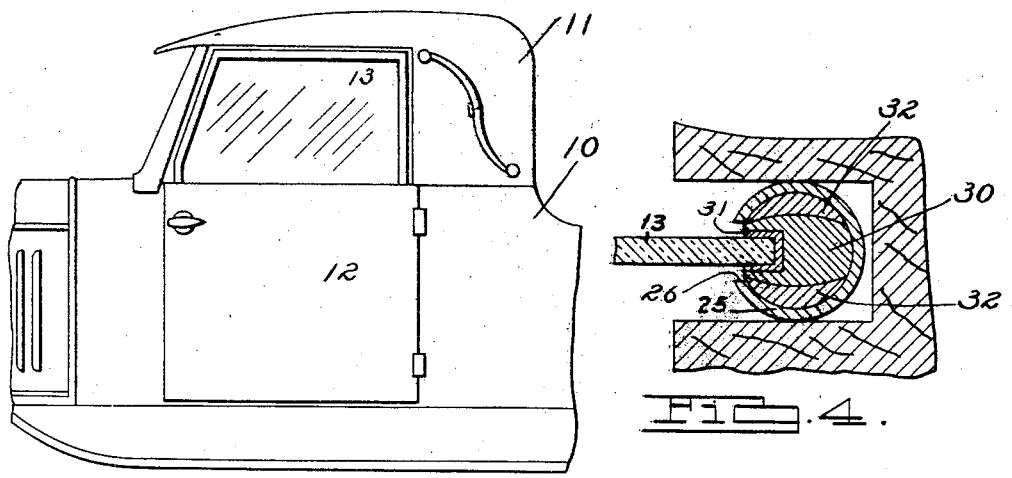
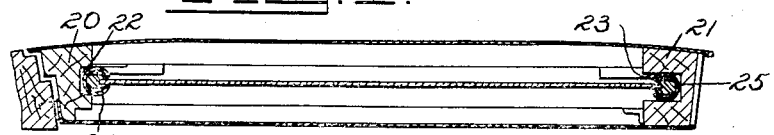
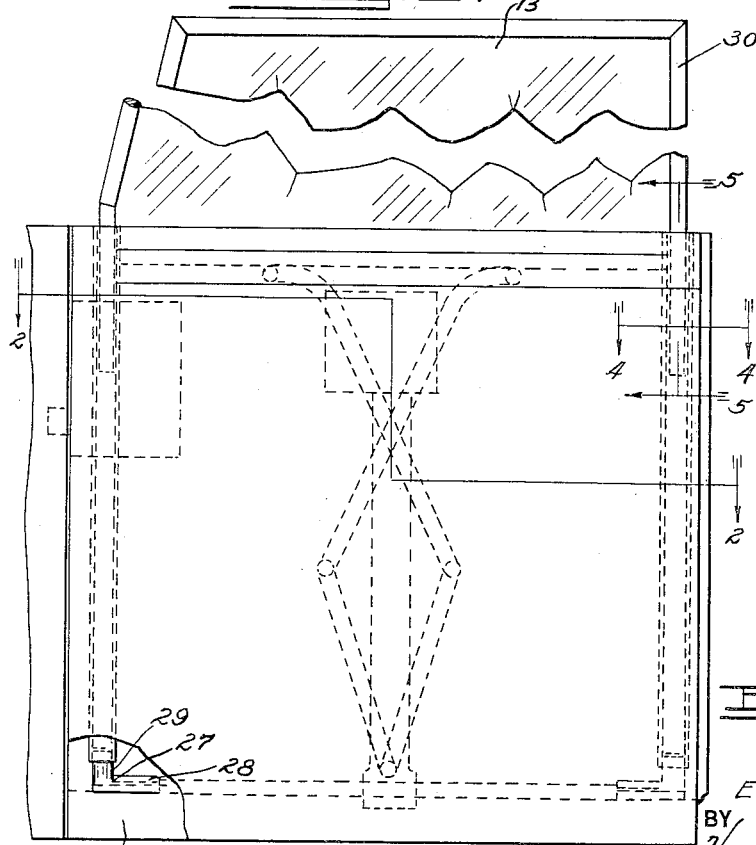
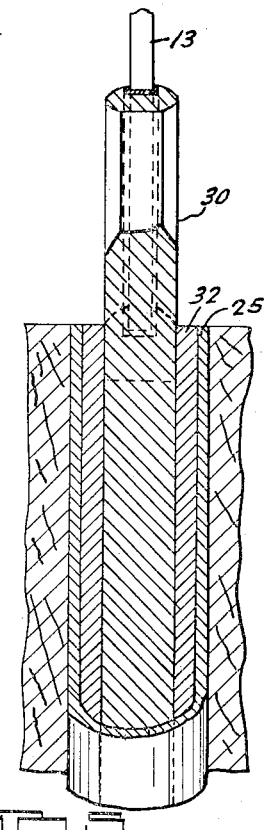
INVENTOR
*Eric W. Ericson.*
BY
ATTORNEYS Patented Aug. 22, 1933

1,923,665

UNITED STATES PATENT OFFICE 1,923,665

MOUNTING FOR SLIDING VEHICLE WINDOWS

Eric W. Ericson, Detroit, Mich., assignor to Dietrich, Incorporated, Detroit, Mich., a Corporation of Michigan Application October 30, 1929. Serial No. 403,403

2 Claims. (Cl. 296—44.5)

The principal object of my invention is to provide a rigid and strong mounting for a sliding window, such as is used in the doors of motor vehicles. The invention is particularly useful in those instances in which no permanent abutting pillars are provided upon the upper half of the door, and which would normally form a guide and casing for the window when it is extended to its uppermost position.

With these and other objects in view, my invention consists in the arrangement, combination and construction of the various parts of my improved device, as described in the specification, claimed in my claims, and shown in the accompanying drawing, in which:

Fig. 1 is a side elevation of a fragment of a vehicle body illustrating the type of door and window in connection with which my invention is particularly useful.

Fig. 2 is a horizontal section of a door and window to which my invention is applied.

Fig. 3 is a side elevation of a door and window embodying my invention, the pertinent parts being indicated chiefly in the dotted lines.

Fig. 4 is a view taken on line 4—4 of Fig. 3.

Fig. 5 is a view taken on line 5—5 of Fig. 3.

I have shown a vehicle body designated generally by the numeral 10 of the cabriolet type, that is, the type in which the top portion 11 may be collapsed and folded back. The door 12 is provided with a sliding window 13. The upper portion of the door, as shown in Fig. 3, is not provided with permanent pillars in which the windows 13 may be secured in its extended position. Heretofore considerable trouble has been encountered owing to the fact that such windows tend to become loose and rattle, to get out of place, and to strike some portion of the windshield or top structure when the door is being closed, and consequently, getting broken. This trouble is largely occasioned by the fact that the edges of the window run in channels lined with felt or other resilient and more or less friction reducing packing material which lends very feeble support to side thrust, and unless the edge guides or channels are provided for the vertical edges of the window in all positions of extension, the exertion of very slight force laterally against the unsupported portion of the window will cause it to rattle and rapidly wear out the packing in the guides. This condition is even apparent in full length doors and windows in closed bodies where lined guide channels are provided for the edges of the window in all positions of extension, and resilient tightening members are often provided to bear against the side of the glass intermediate its edges to prevent it from rattling and wearing out the packing lined channels.

I have provided a slidable mounting for the window which rigidly holds it in position in all positions of extension and which will not become loose or rattle, and which is applicable as well to full length doors and windows of closed bodies.

Although I have illustrated its use in connection with half doors, it is to be understood that I claim all uses to which it may be put.

The vertical pillars 20 and 21 of the door are provided with inwardly facing longitudinally disposed rabbets 22 and 23 in which the edges of the window glass are guided. In these rabbets I have positioned channel members 24 and 25, preferably of rounded section and of metal or similar material which may be secured therein in any suitable manner. These members 24 and 25 have longitudinal slots 26 cut therein and are so positioned that the slotted portions face each other. These members may be secured to the lower cross member 33 of the door by brackets 27 shown in the lower left hand corner of Fig. 3. The brackets each comprise a foot portion 28 which is secured to the cross member 26 and an upwardly extending stud portion 29 which fits within the lower end of the channel member, and may be brazed, welded or pinned thereto as desired. To the vertical edge of the door glass 13 is secured a binding or border member 30 which, in the type of window shown, is usually of metal, hard rubber, bakelite or similar material, and is designed to protect the edge of the glass when exposed in extended position. The edge of the glass is tightly wedged in a slot in the member 30 by means of a channel member of rubber 31, or other suitable packing material. To the lower portions of each vertical edge of the window 13, and to the sides of the border frame 30 at these locations, are secured metal strips 32 which have their outer surfaces so contoured that in assembly with the member 30 they will fit and conform to the channel members 24 and 25. These members 32 are applied only to those portions of the vertical edges of the window which are always concealed within the door, and they slide vertically in the tubes 24 and 25 as the window is raised and lowered.

The metal to metal contact, close and laterally unyielding bearing between the members 32 and the channel members which may be easily lubricated, practically eliminates the wear between the sliding and the stationary parts. The edge of the glass is permanently and immovably held between the members 32. The preferably round or substantially round section of the channels and the sliding members to which the edges of the glass are tightly secured evenly distributes over the bearing surfaces such wear as may occur. Especially when rounded, the channels have an inherent tendency to maintain complete and close bearing contact with the sliding members and to resist lateral deformation. The considerable length of bearing of the slidable portions in the channel members provides a strong and rigid support for the window in all positions, which resists deforming lateral thrust instantly, which will not work loose and rattle, and which will not permit the window when extended to become displaced relative to the door and strike adjacent parts of the body.

Formal changes may be made in the specific embodiment of the invention described without departing from the spirit or substance of the broad invention, the scope of which is commensurate with the appended claims.

What I claim is:

1. The combination with a door having inwardly presented cylindrical window guide runs at the door edges, of a window slidable within said runs, a frame about said window having portions extending downwardly therefrom, and bearing elements on the sides of said downwardly extending portions of said frame forming cylinders therewith which are received by said guide runs to prevent the window from tilting in its plane of movement and laterally of said plane.

2. The combination with a door for a vehicle body having a window contained therewithin, of a frame about said window having projections extending therebelow, cylindrical window guide runs in said door, and bearing elements on the sides of said projecting portions of said frame forming cylindrical extensions on said frame and encompassed by said guide runs to prevent the window from tilting in its plane of movement and laterally of said plane.

ERIC W. ERICSON.